United States Patent
Tsai et al.

(10) Patent No.: US 11,811,114 B2
(45) Date of Patent: Nov. 7, 2023

(54) POWER SUPPLY DEVICE AND METHOD THEREOF FOR FUEL CELL

(71) Applicant: INDUSTRIAL TECHNOLOGY RESEARCH INSTITUTE, Hsinchu (TW)

(72) Inventors: Yin-Wen Tsai, Zhubei (TW); Chih-Wei Hsu, Zhudong Township (TW); Yuh-Fwu Chou, Zhubei (TW); Chin-Yi Shih, Hsinchu (TW); Chien-Chi Chiu, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 247 days.

(21) Appl. No.: 17/137,601

(22) Filed: Dec. 30, 2020

(65) Prior Publication Data

US 2022/0209267 A1    Jun. 30, 2022

(51) Int. Cl.
*H01M 8/04858*    (2016.01)
*H01M 8/04664*    (2016.01)
*B60L 58/40*    (2019.01)

(52) U.S. Cl.
CPC ......... *H01M 8/04888* (2013.01); *B60L 58/40* (2019.02); *H01M 8/04686* (2013.01);
(Continued)

(58) Field of Classification Search
CPC ......... H01M 8/04888; H01M 8/04686; H01M 8/04917; H01M 8/04947; H01M 2250/20; B60L 58/40
See application file for complete search history.

(56) References Cited

U.S. PATENT DOCUMENTS

| | | |
|---|---|---|
| 6,975,091 B2 | 12/2005 | Lee et al. |
| 9,054,385 B2 | 6/2015 | Jones et al. |

(Continued)

FOREIGN PATENT DOCUMENTS

| | | |
|---|---|---|
| TW | I324849 B | 5/2010 |
| TW | I373881 B | 10/2012 |

(Continued)

OTHER PUBLICATIONS

Wang et al., "Bi-directional DC to DC Converters for Fuel Cell Systems," Power Electronics in Transportation, 1998, pp. 47-51.

*Primary Examiner* — Adam A Arciero
(74) *Attorney, Agent, or Firm* — Birch, Stewart, Kolasch & Birch, LLP (57) ABSTRACT

The power supply device is configured on an aircraft and includes a secondary battery, a transformer, a fuel cell and a bypass switch. The transformer is electrically connected between the secondary battery and the aircraft. The fuel cell is suitable for providing a first output current to the aircraft. The bypass switch is connected in parallel with the transformer. The transformer has a first output voltage set value. When a first output terminal voltage of the fuel cell is lower than the first output voltage set value and the bypass switch is in a non-conducting state, a second output current of the secondary battery is provided to the aircraft via the transformer. When the first output terminal voltage is lower than the first output voltage set value and the bypass switch is in a conducting state, the second output current is provided to the aircraft via the bypass switch.

21 Claims, 4 Drawing Sheets

(52) U.S. Cl.
CPC ... *H01M 8/04917* (2013.01); *H01M 8/04947* (2013.01); *H01M 2250/20* (2013.01)

(56) References Cited

U.S. PATENT DOCUMENTS

| | | |
|---|---|---|
| 10,084,312 B2 | 9/2018 | Elliott et al. |
| 2020/0083550 A1* | 3/2020 | Chou ................ H01M 8/04895 |

FOREIGN PATENT DOCUMENTS

| | | |
|---|---|---|
| TW | I429121 B | 3/2014 |
| TW | 202011662 A | 3/2020 |
| TW | I705641 B | 9/2020 |

* cited by examiner

POWER SUPPLY DEVICE AND METHOD THEREOF FOR FUEL CELL

TECHNICAL FIELD

The disclosure relates in general to a power supply device and a method for the fuel cell.

BACKGROUND

Normally, the power requirement of the flight of the drone is provided by the secondary battery (such as lithium battery). Due to the restrictions of space and weight, the secondary battery can only support the flight for dozens of minutes. Therefore, in recent years, a hybrid power architecture of fuel cell and secondary battery is configured on the drone to support the flight for a longer duration.

However, when the power supply of the fuel cell drops or when the fuel cell performs self-maintenance, the load voltage may instantaneously generate a dramatic change, making the quality of power supply deteriorate. Moreover, when the required power of the load is too large, the power supply of the secondary battery may fail or may exceed the rated power of the transformer, and the quality of the power supply will deteriorate as well.

SUMMARY

According to one embodiment, a power supply device configured on an aircraft having an average required power value is provided. The power supply device includes a secondary battery, a transformer, a fuel cell and a bypass switch. The transformer is electrically connected between the secondary battery and the aircraft. The fuel cell is electrically connected to the aircraft and is suitable for providing a first output current to the aircraft. The bypass switch is electrically connected between an output terminal of the secondary battery and an output terminal of the fuel cell and is connected in parallel with the transformer. The transformer has a first output voltage set value. When a first output terminal voltage of the fuel cell is lower than the first output voltage set value and the bypass switch is in a non-conducting state, a second output current of the secondary battery is provided to the aircraft via the transformer. When the first output terminal voltage of the fuel cell is lower than the first output voltage set value and the bypass switch is in a conducting state, the second output current of the secondary battery is provided to the aircraft via the bypass switch. The first output voltage set value is in a range with a corresponding voltage value of a power value between a maximum power value of a characteristic curve of the fuel cell and the average required power value of the aircraft.

According to another embodiment, a power supply device configured on an aircraft having an average required power value is provided. The power supply device includes a secondary battery, a transformer, a fuel cell and a self-maintenance switch. The transformer is electrically connected between the secondary battery and the aircraft. The fuel cell is electrically connected to the aircraft and is suitable for providing a first output current to the aircraft. The self-maintenance switch is electrically connected to the fuel cell and the aircraft and is suitable for shutting down the power output of a part of fuel cell and makes the fuel cell perform a self-maintenance process. The transformer has a first output voltage set value and a second output voltage set value, wherein the second output voltage set value is greater than the first output voltage set value. When a first output terminal voltage of the fuel cell is lower than the first output voltage set value, a second output current of the secondary battery is provided to the aircraft via the transformer. If it is predicted that the first output terminal voltage of the fuel cell will drop soon, the first output voltage set value is dynamically adjusted to the second output voltage set value, and the second output current of the secondary battery is provided to the aircraft via the transformer. The first output voltage set value is in a range with a corresponding voltage value of a power value between a maximum power value of a characteristic curve of the fuel cell and the average required power value of the aircraft.

According to an alternate embodiment, a power supply method of a power supply device is provided. The power supply device is configured on an aircraft and includes a secondary battery, a transformer, a fuel cell and a bypass switch. The transformer is electrically connected between the secondary battery and the aircraft. The fuel cell is electrically connected to the aircraft. The bypass switch is electrically connected between the secondary battery and the fuel cell and is connected in parallel with the transformer. The transformer has a first output voltage set value. The power supply method includes the following steps. A first output current is provided to the aircraft by the fuel cell. When a first output terminal voltage of the fuel cell is lower than the first output voltage set value, a second output current of the secondary battery is provided to the aircraft by the transformer. Under a specific condition, the bypass switch is controlled to be conducted, such that the second output current of the secondary battery is provided to the aircraft via the bypass switch instead of the transformer, wherein, the specific condition refers to the situation when a rated output power of the transformer is unable to supply the required power to the aircraft, the transformer is in an abnormal state or the fuel cell performs self-maintenance.

According to another alternate embodiment, a power supply method of a power supply device is provided. The power supply device is configured on an aircraft. The power supply device includes a secondary battery, a transformer, a fuel cell and a self-maintenance switch. The transformer is electrically connected between the secondary battery and the aircraft. The fuel cell is electrically connected to the aircraft. The self-maintenance switch is electrically connected to the fuel cell and the aircraft and is suitable for shutting down the power output of a part of fuel cell and makes the fuel cell perform a self-maintenance process. The transformer has a first output voltage set value and a second output voltage set value, wherein the second output voltage set value is greater than the first output voltage set value. The power supply method includes the following steps. A first output current is provided to the aircraft by the fuel cell. When a first output terminal voltage of the fuel cell is lower than the first output voltage set value, a second output current of the secondary battery is provided to the aircraft by the transformer. If it is predicted that the first output terminal voltage of the fuel cell will drop soon, the first output voltage set value of the transformer is dynamically adjusted to the second output voltage set value, and the second output current of the secondary battery is provided to the aircraft via the transformer. The first output voltage set value is in a range with a corresponding voltage value of a power value between a maximum power value of a characteristic curve of the fuel cell and the average required power value of the aircraft.

The above and other aspects of the disclosure will become better understood with regard to the following detailed description of the preferred but non-limiting embodiment(s). The following description is made with reference to the accompanying drawings.

DETAILED DESCRIPTION

Detailed descriptions of the disclosure are disclosed below with a number of embodiments. However, the disclosed embodiments are for explanatory and exemplary purposes only, not for limiting the scope of protection of the disclosure. Similar/identical designations are used to indicate similar/identical elements. Directional terms such as above, under, left, right, front or back are used in the following embodiments to indicate the directions of the accompanying drawings, not for limiting the present disclosure.

The present disclosure relates to a power supply device and a method capable of maintaining the load voltage within a predetermined range to avoid the load voltage changing dramatically.

First Embodiment

Figure 1A:
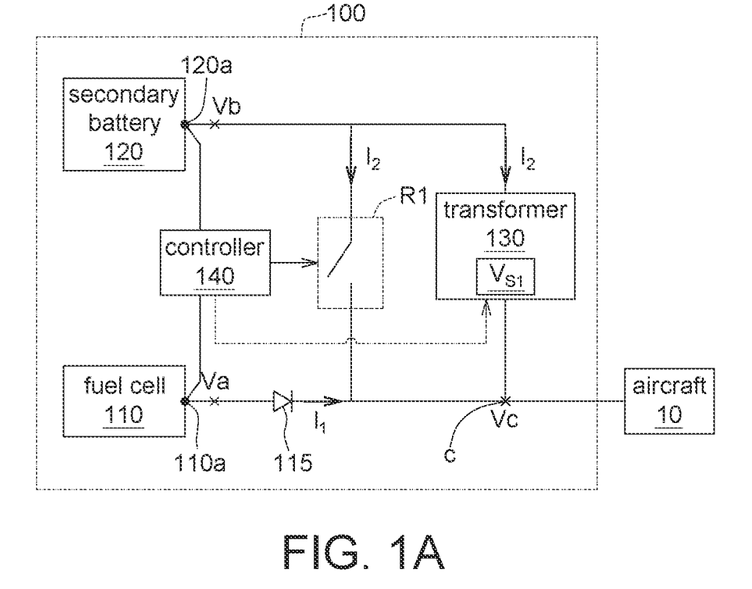
FIG. 1A is a schematic diagram of a power supply device according to an embodiment of the present disclosure.
Figure 1B:
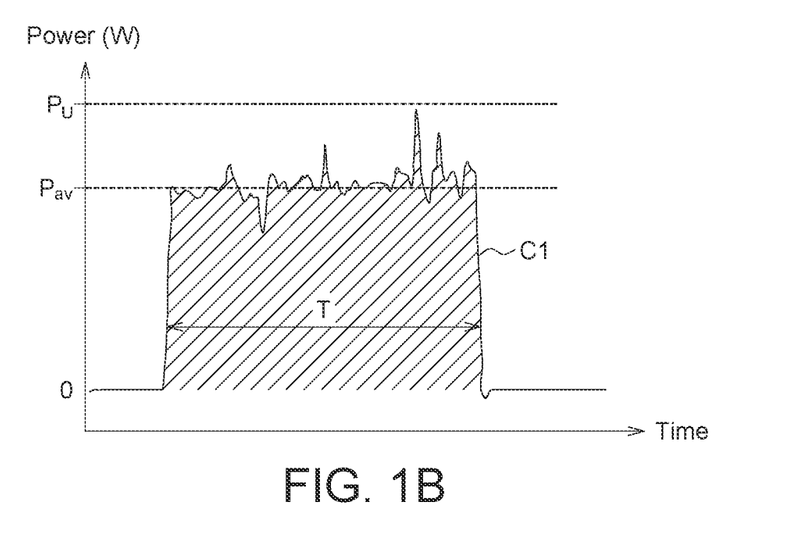
FIG. 1B is a relation diagram of the required power vs. the flight time of the aircraft of FIG. 1A.

Refer to FIGS. 1A and 1B, FIG. 1A is a schematic diagram of a power supply device according to an embodiment of the present disclosure. FIG. 1B is a relation diagram of the required power vs. the flight time of the aircraft 10 of FIG. 1A. The power supply device 100 is configured on the aircraft 10 to provide a power to the aircraft 10. The aircraft 10 may be a drone.

According to an embodiment of the present disclosure, the power supply device 100 includes a fuel cell 110, a diode 115, a secondary battery 120, a transformer 130, a controller 140 and a bypass switch R1. The transformer 130 is electrically connected between the secondary battery 120 and the aircraft 10. The fuel cell 110 is electrically connected to the aircraft 10 to provide a first output current $I_1$ to the aircraft 10. The aircraft 10 has an average required power value $P_{av}$, which is determined according to the flight mode of the aircraft 10 and is not limited in the present embodiment.

Refer to FIG. 1A, The transformer 130 has a first output voltage set value $V_{S1}$. When the first output terminal voltage Va of the output terminal 110a of the fuel cell 110 is lower than the first output voltage set value $V_{S1}$ and the bypass switch R1 is in a non-conducting state, the second output current $I_2$ of the secondary battery 120 is provided to the aircraft 10 via the transformer 30. Besides, when the first output terminal voltage Va of the output terminal 110a of the fuel cell 110 is lower than the first output voltage set value $V_{S1}$ and the bypass switch R1 is in a conducting state, the second output current $I_2$ of the secondary battery 120 is provided to the aircraft 10 via the conducted bypass switch R1. Meanwhile, the transformer 130 is in a shut-down state (that is, the second output current $I_2$ is not provided to the aircraft 10 via the transformer 130).

The controller 140 is electrically connected to the output terminal 110a of the fuel cell 110 and the output terminal 120a of the secondary battery 120 to detect the first output terminal voltage Va and the second output terminal voltage Vb. The controller 140 is electrically connected to the bypass switch R1 and is suitable for controlling the conducting states (conducting or non-conducting) of the bypass switch R1. Additionally, the controller 140 is electrically connected to the transformer 130 and is suitable for detecting the state of the transformer 130 and sets the first output voltage set value $V_{S1}$ of the transformer 130.

Moreover, the diode 115 is electrically connected between the fuel cell 110 and the bypass switch R1, wherein the positive of the diode 115 is connected to the fuel cell 110 and the negative of the diode 115 is connected to the bypass switch R1 to prevent the second output current $I_2$ of the secondary battery 120 from flowing back to the fuel cell 110.

In an embodiment, the maximum second output terminal voltage Vb that the output terminal 120a of the secondary battery 120 can provide is higher than the maximum first output terminal voltage Va that the output terminal 110a of the fuel cell 110 can provide, and the transformer 130 can be a step-down transformer. Thus, when the second output terminal voltage Vb of the secondary battery 120 is higher than the first output voltage set value $V_{S1}$, the transformer 130 can buck the second output terminal voltage Vb of the secondary battery 120 to the first output voltage set value $V_{S1}$. The transformer 130 can be a direct current to direct current (DC/DC) transformer.

In an embodiment, the bypass switch R1 can be a transistor or other relay switch. The bypass switch R1 is connected in parallel with the transformer 130 and is electrically connected between the output terminal 110a of the fuel cell 110 and the output terminal 120a of the secondary battery 120. When the first output terminal voltage Va of the fuel cell 110 is lower than the first output voltage set value $V_{S1}$ and the bypass switch R1 is in a conducting state, the second output current $I_2$ of the secondary battery 120 is provided to the aircraft 10 and a bypass path is formed after the bypass switch R1 is conducted. Therefore, the second output current $I_2$ of the secondary battery 120 will not flow through the transformer 130.

After the bypass switch R1 is conducted, the secondary battery 120 can provide a greater second output current $I_2$ and is not limited to the rated output power of the transformer 130, such that the power shortage caused by the fuel cell 110 can be quickly filled up to achieve a steady power supply.

Refer to FIG. 1A. The transformer 130 can detect the node voltage Vc of the node c connected between the fuel cell 110 and the aircraft 10. Since the voltage loss between the output terminal 110a of the fuel cell 110 and the node c is negligible, the node voltage Vc detected by the transformer 130 is substantially equivalent to the first output terminal voltage Va of the output terminal 110a of the fuel cell 110. In other words, when the node voltage Vc detected by the transformer 130 is lower than the first output voltage set value $V_{S1}$, that is, the first output terminal voltage Va of the fuel cell 110 is lower than the first output voltage set value $V_{S1}$, the second output current $I_2$ of the secondary battery 120 can be provided to the aircraft 10 via the transformer 130 or the bypass switch R1.

The secondary battery 120 provides the second output current $I_2$ to the aircraft 10 via the transformer 130 or the bypass switch R1 only when the first output terminal voltage Va of the fuel cell 110 is lower than the first output voltage set value $V_{S1}$. When the first output terminal voltage Va of the fuel cell 110 is higher than or equivalent to the first output voltage set value $V_{S1}$, the fuel cell 110 directly provides power to the aircraft 10 and the secondary battery 120 no more provides the current to the aircraft 10, such that the loss of the current flowing through the transformer 130 can be reduced and the power consumption of the secondary battery 120 can also be reduced.

Refer to FIG. 1B. The curve C1 represents the relation of power vs time of the operation of the aircraft 10 (such as the take-off, flight, and descending process of the aircraft), wherein $P_{av}$ represents the average required power value, $P_U$ represents the largest required power. During a period of time T when the aircraft 10 operates, the average required power value $P_{av}$ is provided by the fuel cell 110, and the instantaneous power between the average required power value $P_{av}$ and the largest required power $P_U$ is provided by the secondary battery 120. In other words, the secondary battery 120 fills up the required instantaneous power of the aircraft 10 (for example, the aircraft needs a greater power when making a turn or resisting the gust).

The fuel cell 110 has the advantage of high energy density and is the main power supply which provides the required power for the basic load. However, the fuel cell 110 is unable to instantaneously increase the power supply, and when the load requirement increases instantaneously, the secondary battery 120 with high power density provides power for the additional requirement of power.

Figure 1C:
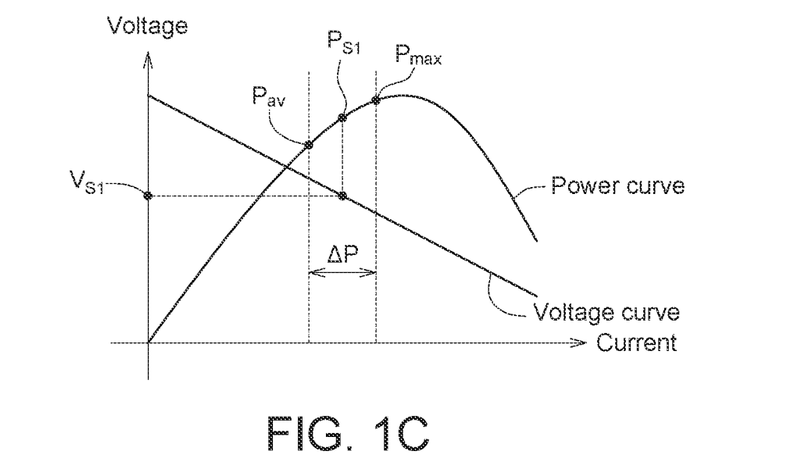
FIG. 1C is a characteristic curve of a fuel cell.

FIG. 1C is a characteristic curve of the fuel cell 110 and includes a relation between voltage vs current (representing a voltage curve) and a power curve. As indicated in FIG. 10, the first output voltage set value $V_{S1}$ is the value of a point on the voltage curve of the characteristic curve. The first output voltage set value $V_{S1}$ is a corresponding voltage value of a power value $P_{S1}$ in the range $\Delta P$ that is between a maximum power value $P_{max}$ of the characteristic curve of the fuel cell 110 and the average required power value $P_{av}$ of the aircraft 10.

Details of the power supply method of the power supply device 100 are disclosed below. When the aircraft 10 starts to operate, a second output current $I_2$ is provided to the aircraft 10 via the transformer 130 by the secondary battery 120 as the required power (bad) for the initial stage of the operation of the aircraft 10 (such as the required power for starting the rotation of the blades), Meanwhile, the node voltage Vc of the input terminal of the aircraft 10 is close to the first output voltage set value $V_{S1}$. When the first output terminal voltage Va of the fuel cell 110 continues to rise to be greater than or equivalent to the first output voltage set value $V_{S1}$, the transformer 130 stops providing the second output current $I_2$ to the aircraft 10 and causes the secondary battery 120 to stop outputting the current to the aircraft 10, Meanwhile, the fuel cell 110 is the main source of power supply which provides the first output current $I_1$ to the aircraft 10, and the first output terminal voltage Va of the fuel cell 110 varies with the level of the required power of the aircraft 10. When the required power of the aircraft 10 increases (for example, when the aircraft ascends, the rotation speed of the blades increases), the fuel cell 110 increases the first output current $I_1$ provided to the aircraft 10 and causes the first output terminal voltage Va of the fuel cell 110 to drop. When the first output terminal voltage Va of the fuel cell 110 is lower than the first output voltage set value $V_{S1}$, the transformer 130 provides the second output current $I_2$ of the secondary battery 120 as an auxiliary source of power supply to the aircraft. Under a specific condition, for example, the situation when the rated output power of the transformer 130 is unable to supply the required power to the aircraft 10, the state of the transformer 130 is abnormal or the fuel cell 110 performs self-maintenance (more details later), the bypass switch R1 is controlled to be conducted, such that the secondary battery 120 provides a power greater than the rated output power of the transformer 130 to the aircraft 10 via the bypass switch R1 In the present embodiment, under the circumstance that the rated output power of the transformer 130 is unable to fill up the required auxiliary power of the aircraft 10, the controller 140 can control the bypass switch R1 to be conducted, such that the secondary battery 120 can provide a power greater than the rated output power of the transformer 130 to the aircraft 10. Meanwhile, the secondary battery 120 does not provide the second output current $I_2$ via the transformer 130.

In another embodiment, when the controller 140 detects that the transformer 130 is in an abnormal state, for example, the situation when the internal temperature of the transformer 130 reaches a predetermined value or the output power reaches a predetermined value, the transformer 130 is unable to provide the required auxiliary power to the aircraft 10, the controller 140 can also control the bypass switch R1 to be conducted, such that the secondary battery 120 can provide a power greater than the rated output power of the transformer 130 to the aircraft 10.

Figure 1D:
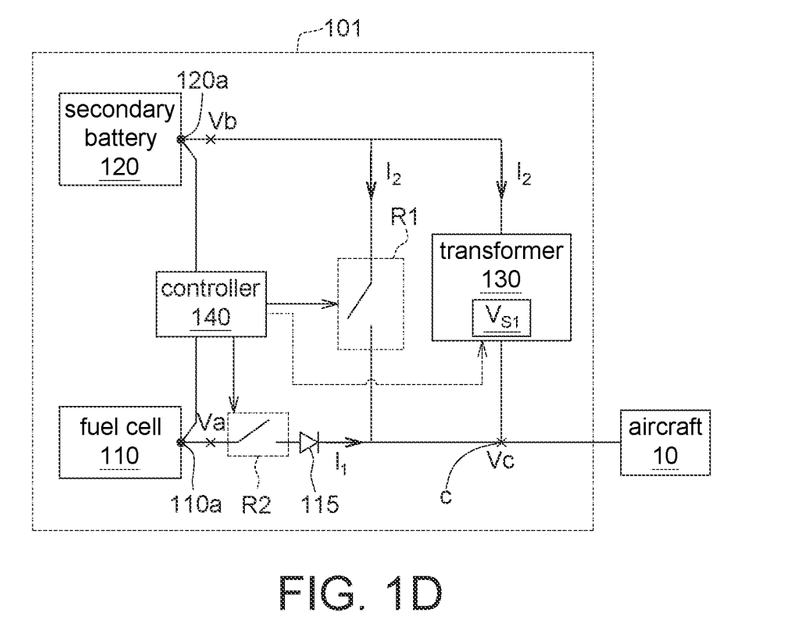
FIG. 1D is a schematic diagram of a power supply device according to another embodiment of the present disclosure.

Referring to FIG. 1D a schematic diagram of a power supply device 101 according to another embodiment of the present disclosure is shown. The power supply device 101 of the present embodiment is similar to the power supply device 100 of FIG. 1A but it is noted that the power supply device 101 further includes a self-maintenance switch R2 electrically connected to the fuel cell 110 and the aircraft 10. The self-maintenance switch R2 is suitable for shutting down the power output of a part of fuel cell 110 and makes the fuel cell 110 perform a self-maintenance process. For example, in each period of time (for example, 10 seconds), the fuel cell 110 must stop the power output of a part of fuel cell for about 0.05-0.5 seconds to perform an internal moisture operation, To put it in greater details, the fuel cell 110 has more than one fuel cell stack connected in parallel, and has an individual self-maintenance switch R2, so that the output of parts or all of fuel cell stacks can be conveniently turned off. In the present embodiment, before the fuel cell 110 performs the self-maintenance process, the bypass switch R1 is conducted by the controller 140 in advance, such that the second output current $I_2$ of the secondary battery 110 is provided to the aircraft 10 via the bypass switch R1. Then, the self-maintenance switch R2 is disconnected, such that the fuel cell 110 can enter the self-maintenance process. Thus, the voltage of the aircraft 10 will not drop abruptly when the fuel cell 110 performs the self-maintenance process, After the self-maintenance process finishes, the controller 140 conducts the self-maintenance switch R2 to resume the first output terminal voltage Va of the fuel cell 110. Then, the bypass switch R1 is disconnected, and the second output current $I_2$ of the secondary battery 120 is provided to the aircraft 10 via the transformer 130 when the first output terminal voltage Va of the fuel cell 110 is lower than the first output voltage set value $V_{S1}$.

Second Embodiment

Figure 2A:
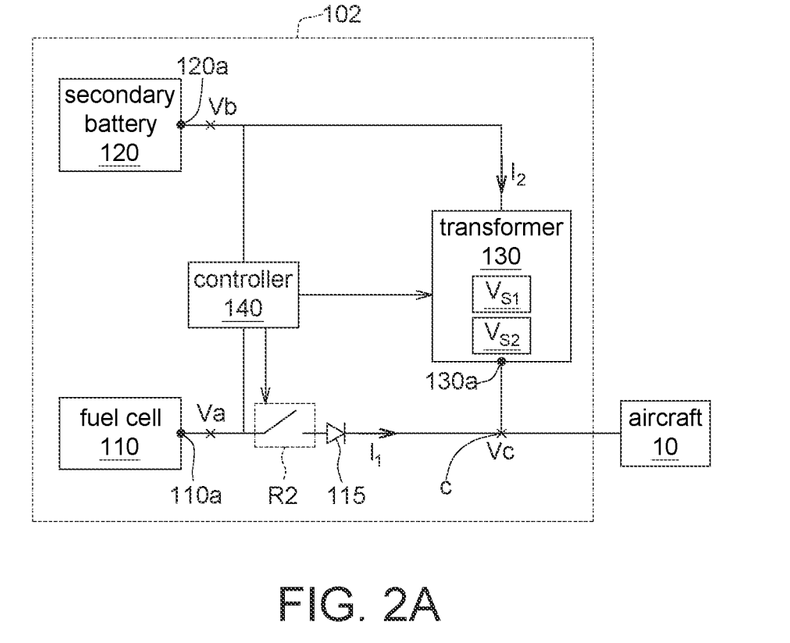
FIG. 2A is a schematic diagram of a power supply device according to an embodiment of the present disclosure.

Referring to FIG. 2A, a schematic diagram of a power supply device 102 according to an embodiment of the present disclosure is shown. The power supply device 102 is configured on the aircraft 10 to provide a power to the aircraft 10. The aircraft 10 may be a drone.

The power supply device 102 includes a fuel cell 110, a diode 115, a secondary battery 120, a transformer 130, a controller 140 and a self-maintenance switch R2. The transformer 130 has a first output voltage set value $V_{S1}$ and a second output voltage set value $V_{S2}$, wherein the second output voltage set value $V_{S2}$ is greater than the first output voltage set value $V_{S1}$, and the second output voltage set value $V_{S2}$ is close to but slightly smaller than the first output terminal voltage Va (or the node voltage Vc) of the output terminal 110a of the fuel cell 110. The power supply method of the power supply device 102 is basically similar to that of the power supply device 101, but it is noted that when the first output terminal voltage Va of the fuel cell 110 is lower than the first output voltage set value $V_{S1}$, the second output current $I_2$ of the secondary battery 120 is provided to the aircraft 10 via the transformer 130. If it is predicted that the first output terminal voltage Va of the output terminal 110a of the fuel cell 110 will drop soon, for example, when the fuel cell 110 performs self-maintenance or it needs to shut down the power output of a part of fuel cell, the controller 140 can dynamically adjust the first output voltage set value $V_{S1}$ of the transformer 130 to the greater second output voltage set value $V_{S2}$ to drop the threshold of auxiliary power supply of the secondary battery 120, such that during the period when the first output terminal voltage Va of the output terminal 110a of the fuel cell 110 stops or reduces outputting the first output current the second output current $I_2$ of the secondary battery 120 is provided to the aircraft 10 via the transformer 130 to avoid the power of the load end having dramatic change and causing problem to the operation of the aircraft 10 when the first output terminal voltage Va stops or reduces outputting the first output current $I_1$. When the first output terminal voltage Va of the output terminal 110a of the fuel cell 110 is again higher than the second output voltage set value $V_{S2}$, the transformer 130 is adjusted to the first output voltage set value $V_{S1}$, such that the first output terminal voltage Va of the output terminal 110a of the fuel cell 110 can resume to output the first output current $I_1$.

The controller 140 is electrically connected to the output terminal 110a of the fuel cell 110 and the output terminal 120a of the secondary battery 120 to detect the first output terminal voltage Va and the second output terminal voltage Vb. Furthermore, the controller 140 is electrically connected to the transformer 130 and is suitable for detecting the state of the transformer 130 and sets the output voltage set value of the transformer 130, such that the transformer 130 has the first output voltage set value $V_{S1}$ or the second output voltage set value $V_{S2}$ which can be dynamically adjusted Besides, the diode 115 is electrically connected between the fuel cell 110 and the transformer 130 to prevent the second output current $I_2$ of the secondary battery 120 from flowing back to the fuel cell 110.

The self-maintenance switch R2 is electrically connected to the fuel cell 110 and the aircraft 10. The self-maintenance switch R2 is suitable for shutting down the power output of a part of fuel cell to perform a self-maintenance process for the fuel cell 110. The controller 140 is suitable for controlling the conducting states (conducting or non-conducting) of the self-maintenance switch R2.

Before the fuel cell 110 performs the self-maintenance process, the controller 140 obtains a node voltage Vc and adjusts the transformer 130 to the second output voltage set value $V_{S2}$ according to the node voltage Vc. When the fuel cell 110 performs a self-maintenance process, the self-maintenance switch R2 is disconnected: meanwhile, the transformer 130 maintains the voltage of the aircraft 10 at the expected second output voltage set value $V_{S2}$ and provides the second output current $I_2$ of the secondary battery 120 to the aircraft 10. Thus, when the fuel cell 110 performs the self-maintenance process, the voltage of the aircraft 10 will not abruptly drop due to a shortage of power supply. After the self-maintenance process finishes, the self-maintenance switch R2 is conducted and the output setting of the transformer 130 changes to the first output voltage set value $V_{S1}$ from the second output voltage set value $V_{S2}$, such that the first output terminal voltage Va of the fuel cell 110 can resume to supply power to the aircraft 10.

In an embodiment, the fuel cell 110 can be formed of 72 fuel cell units connected in series, wherein the operating voltage of each fuel cell unit is between 0.608V and 0.692V. Thus, the fuel cell 110 can provide an operating voltage between 43.8V and 49.8V, but the present disclosure is not limited thereto. In an embodiment, the first output voltage set value $V_{S1}$ and the second output voltage set value $V_{S2}$ can be within the range of the operating voltage of the fuel cell 110, For example, the first output voltage set value $V_{S1}$ can be 43.8V, and the second output voltage set value $V_{S2}$ can be 46.8V.

Additionally, the secondary battery 120 can be formed of 12 secondary battery cells connected in series, wherein the operating voltage of each secondary battery cell is between 3.65V and 4.15V. Thus, the secondary battery 120 can provide an operating voltage between 43.8V and 49.8V, but the present disclosure is not limited thereto.

Figure 2B:
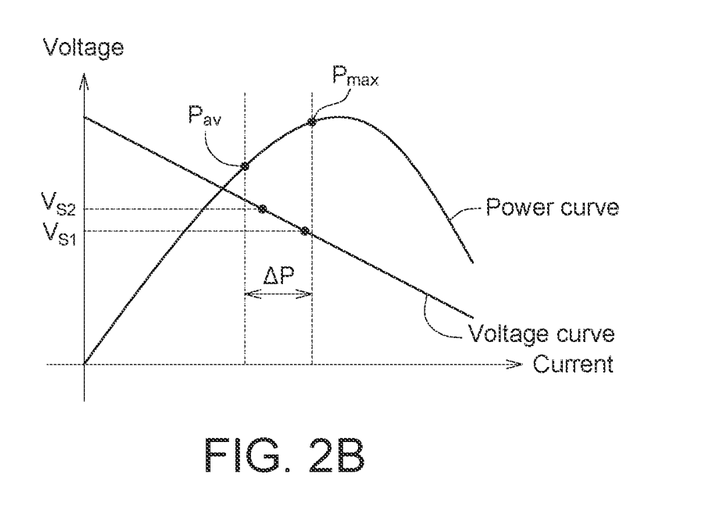
FIG. 2B is a schematic diagram of a characteristic curve of the fuel cell of FIG. 2A.

FIG. 2B is a characteristic curve of the fuel cell 110 of FIG. 2A. The characteristic curve includes a relation between voltage vs current (representing a voltage curve) and a power curve. As indicated in FIG. 2B, the first output voltage set value $V_{S1}$ and the second output voltage set value $V_{S2}$ are at two points on the voltage curve of the characteristic curve. The first output voltage set value $V_{S1}$ and the second output voltage set value $V_{S2}$ are two corresponding voltage values of power values in the range ΔP that is between a maximum power value $P_{max}$ of the characteristic curve of the fuel cell 110 and the average required power value $P_{av}$ of the aircraft 10, In other embodiments, the second output voltage set value $V_{S1}$ only needs to be higher than the first output voltage set value $V_{S1}$ and does not have to be lower than the corresponding voltage value of the average power value $P_{av}$ of the aircraft 10, In an embodiment, the first output voltage set value $V_{S1}$ can be a voltage corresponding to the maximum power value $P_{max}$ of the characteristic curve of the fuel cell 110, and the second output voltage set value $V_{S2}$ can be a voltage corresponding to the average required power value $P_{av}$ of the aircraft 10.

In the present embodiment, if it is predicted that the first output terminal voltage Va of the fuel cell 110 will drop dramatically or the required power of the aircraft 10 will increase dramatically, the first output voltage set value $V_{S1}$ can be dynamically adjusted to the second output voltage set value $V_{S2}$ to reduce the threshold of auxiliary power supply of the secondary battery 120, such that the second output current $I_2$ generated by the secondary battery 120 can be provided to the aircraft 10 earlier to avoid the shortage of power supply that may possibly be caused by the fuel cell 110.

In the present embodiment, the output setting of the transformer 130 can be dynamically adjusted to the first output voltage set value $V_{S1}$ or the second output voltage set value $V_{S2}$ according to the first output terminal voltage Va of the fuel cell 110, such that the required voltage of the aircraft 10 will not change dramatically when the output power of the fuel cell 110 drops or the first output current changes. The second output voltage set value $V_{S2}$ (such as 46.8V) can be set to be close to the first output terminal voltage Va (such as 47V) before the self-maintenance process is performed. Thus, when the fuel cell 110 performs self-maintenance, the fuel cell 110 stops outputting the first output current $I_1$ and the transformer 130 provides the second output voltage set value $V_{S2}$, such that the voltage of the aircraft 10 will remain stable and will not change dramatically.

Figure 2C:
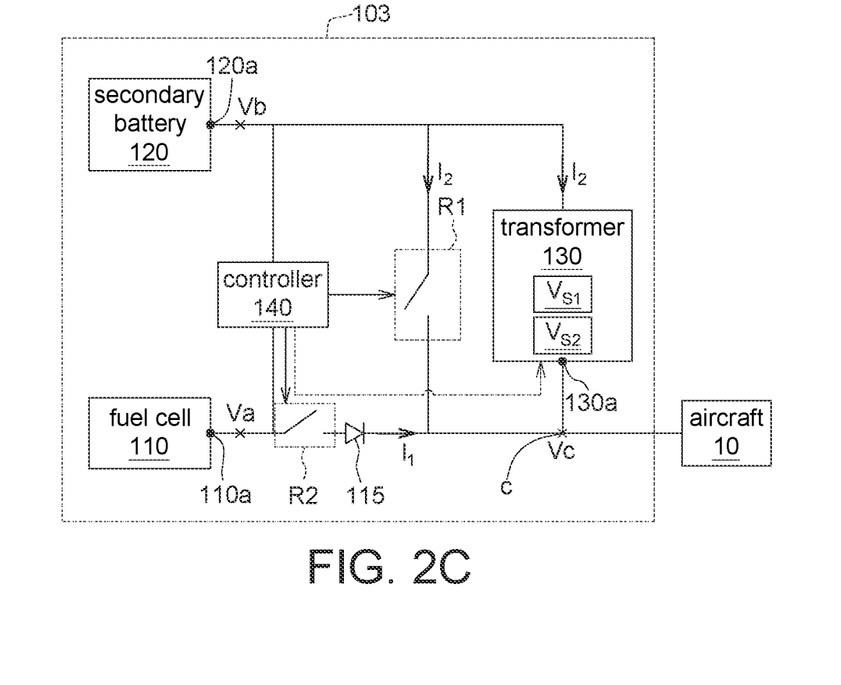
FIG. 2C is a schematic diagram of a power supply device according to another embodiment of the present disclosure.

In the first embodiment and the second embodiment disclosed above, the bypass switch R1 of the first embodiment and the method for dynamically adjusting the output voltage set value of the transformer 130 of the second embodiment can be combined together. Referring to FIG. 2C, a schematic diagram of a power supply device 103 according to another embodiment of the present disclosure is shown. That is, before the fuel cell 110 performs the self-maintenance process, if it is predicted that the first output terminal voltage Va of the fuel cell 110 will drop soon, for example, the fuel cell 110 is at the self-maintenance stage or the fuel cell 110 needs to shut down the power output of a part of fuel cell, the controller 140 can dynamically adjust the output setting of the transformer 130 to the greater second output voltage set value $V_{S2}$ from the first output voltage set value $V_{S1}$ to drop the threshold of auxiliary power supply of the secondary battery 120, such that during the period when the fuel cell 110 stops or reduces outputting the first output current $I_1$, the second output current $I_2$ of the secondary battery 120 is provided to the aircraft 10 via the transformer 130. When the self-maintenance process finishes, the self-maintenance switch R2 is conducted and the output setting of the transformer 130 changes to the first output voltage set value $V_{S1}$ from the second output voltage set value $V_{S2}$, such that the first output terminal voltage Va of the fuel cell 110 can resume to supply power to the aircraft 10 to avoid the voltage of the aircraft 10 changing dramatically. In an embodiment, the second output current $I_2$ of the secondary battery 120 can also be provided to the aircraft 10 via the bypass switch R1. That is, before the self-maintenance process is performed, the bypass switch R1 is conducted in advance, and the second output current $I_2$ of the secondary battery 120 is provided to the aircraft 10 via the bypass switch R1. After the self-maintenance process finishes, the bypass switch R1 is disconnected, and the fuel cell 110 resumes to output power with the first output current $I_1$. Furthermore, if the controller 140 detects that the transformer 130 is in an abnormal state, for example, the internal temperature of the transformer 130 reaches a predetermined value or the output power reaches a predetermined value, such that the transformer 130 is unable to provide the required auxiliary power to the aircraft 10, the controller 140 can control the bypass switch R1 to be conducted, such that the secondary battery 120 can directly drive the load via a bypass to provide a power greater than the rated output power of the transformer 130 to the aircraft 10 to avoid the failure of the power of the load due to the rated limit or failure of the transformer 130.

Figure 3:
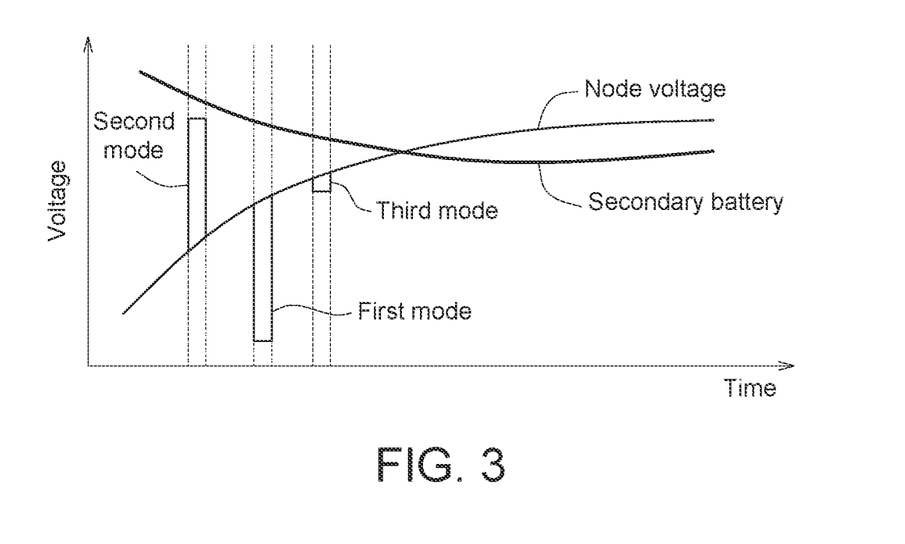
FIG. 3 is a schematic diagram of voltage change at the output point during the period when the fuel cell stack temporarily stops or reduces power output.

Refer to FIG. 3, a schematic diagram of voltage change at the output point (that is, the node voltage Vc) during the period when the fuel cell stack temporarily stops or reduces power output is shown. Under normal circumstances, the fuel cell 110 is the main power supply, and the voltage curve of the node is basically similar to the voltage curve of the fuel cell, therefore the voltage curve of the fuel cell is not illustrated in FIG. 3. In the first mode, the output voltage set value is fixed. During the period when the fuel cell stack temporarily stops or reduces power output, the aircraft 10 continuously loads in the required power, and the voltage of the fuel cell 110 may instantaneously drop to the fixed output voltage set value (such as 43.8V) set by the transformer 130. Therefore, the voltage curve of the node has an abrupt drop in the first mode. In the second mode, the bypass switch R1 is conducted according to the embodiment of FIG. 1D. During the period when the fuel cell stack temporarily stops or reduces power output, the power is directly provided by the secondary battery 120, therefore the voltage curve of the node abruptly surges to be close to the voltage (such as 49V) of the secondary battery 120. If the voltage of the secondary battery 120 is much higher than the node voltage, the voltage of the load point will instantaneously surge. In the third mode, the output voltage set value is dynamically adjusted according to the embodiment of FIG. 2A, Before the fuel cell stack temporarily stops or reduces power output, the output setting of the transformer 130 is dynamically adjusted to be close to the output point voltage (such as 47V), such that during the period when the fuel cell stack temporarily stops or reduces power output, the output point voltage can maintain at the second output voltage set value (such as 46.8V) instead of dropping or surging abruptly, and the load end can have a stable node voltage.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A power supply device configured on an aircraft having an average required power value, wherein the power supply device comprises:
   a secondary battery;
   a transformer electrically connected between the secondary battery and the aircraft; and
   a fuel cell electrically connected to the aircraft and suitable for providing a first output current to the aircraft; and
   a bypass switch electrically connected between an output terminal of the secondary battery and an output terminal of the fuel cell and the bypass switch and connected in parallel with the transformer;
   wherein, the transformer has a first output voltage set value, when a first output terminal voltage of the fuel cell is lower than the first output voltage set value and the bypass switch is in a non-conducting state, a second output current of the secondary battery is provided to the aircraft via the transformer; when the first output terminal voltage of the fuel cell is lower than the first output voltage set value and the bypass switch is in a conducting state, the second output current of the secondary battery is provided to the aircraft via the bypass switch;
   wherein, the first output voltage set value is a corresponding voltage value of a power value in a power range between a maximum power value of a characteristic curve of the fuel cell and the average required power value of the aircraft.

2. The power supply device according to claim 1, further comprising a diode electrically connected between the fuel cell and the bypass switch, wherein a positive of the diode is connected to the fuel cell, and a negative of the diode is connected to the bypass switch.

3. The power supply device according to claim 1, further comprising a self-maintenance switch electrically connected to the fuel cell and the aircraft, wherein the self-maintenance switch is suitable for turning off a power of a part of the fuel cell and makes the fuel cell perform a self-maintenance process; before the fuel cell performs the self-maintenance process, the bypass switch is switched into a conducting state; after the self-maintenance process finishes, the bypass switch is disconnected as in a non-conducting state.

4. The power supply device according to claim 1, further comprising a controller electrically connected to the bypass switch and the transformer, wherein the controller is suitable for controlling a conducting state of the bypass switch and detecting a state of the transformer; when the controller detects that the transformer is in an abnormal state, the controller controls the bypass switch to be conducted and makes the secondary battery provide a power greater than a rated output power of the transformer.

5. The power supply device according to claim 4, wherein the abnormal state of the transformer refers to a situation when an internal temperature of the transformer reaches a predetermined value or an output power of the transformer reaches a predetermined value.

6. The power supply device according to claim 1, wherein a maximum of the second output terminal voltage that the secondary battery can provide is higher than a maximum of the first output terminal voltage that the fuel cell can provide.

7. A power supply method of a power supply device according to claim 1, wherein the power supply method comprises:
providing the first output current to the aircraft by the fuel cell;
when the first output terminal voltage of the fuel cell is lower than the first output voltage set value, providing the second output current of the secondary battery to the aircraft by the transformer; and
under a specific condition, controlling the bypass switch to be conducted, such that the second output current of the secondary battery is provided to the aircraft via the bypass switch instead of the transformer;
wherein, the specific condition refers to a situation when a rated output power of the transformer is unable to supply a required power to the aircraft, the transformer is in an abnormal state or the fuel cell performs self-maintenance.

8. The power supply method according to claim 7, wherein a maximum of the second output terminal voltage that the secondary battery can provide is higher than a maximum of the first output terminal voltage that the fuel cell can provide.

9. The power supply method according to claim 7, wherein the abnormal state of the transformer refers to a situation when an internal temperature of the transformer reaches a predetermined value or an output power of the transformer reaches a predetermined value.

10. The power supply method according to claim 7, wherein the power supply device further comprises a self-maintenance switch electrically connected to the fuel cell and the aircraft; the self-maintenance switch is suitable for shutting down a power output of a part of the fuel cell and makes the fuel cell perform a self-maintenance process; before the fuel cell performs the self-maintenance process, the bypass switch is switched into a conducting state; after the self-maintenance process finishes, the bypass switch is disconnected as in a non-conducting state.

11. A power supply device configured on an aircraft having an average required power value, wherein the power supply device comprises:
a secondary battery;
a transformer electrically connected between the secondary battery and the aircraft;
a fuel cell electrically connected to the aircraft and suitable for providing a first output current to the aircraft; and
a self-maintenance switch electrically connected to the fuel cell and the aircraft, wherein the self-maintenance switch is suitable for shutting down a power output of a part of the fuel cell and makes the fuel cell perform a self-maintenance process;
wherein, the transformer has a first output voltage set value and a second output voltage set value greater than the first output voltage set value; when a first output terminal voltage of the fuel cell is lower than the first output voltage set value, a second output current of the secondary battery is provided to the aircraft via the transformer; if it is predicted that the first output terminal voltage of the fuel cell will drop soon, the first output voltage set value of the transformer is dynamically adjusted to the second output voltage set value, and the second output current of the secondary battery is provided to the aircraft via the transformer;
wherein, the first output voltage set value is a corresponding voltage value of a power value in a power range between a maximum power value of a characteristic curve of the fuel cell and the average required power value of the aircraft.

12. The power supply device according to claim 11, wherein, the first output voltage set value is a voltage corresponding to a maximum power value of the characteristic curve of the fuel cell, and the second output voltage set value is a voltage corresponding to the average required power value of the aircraft.

13. The power supply device according to claim 11, further comprising a bypass switch electrically connected between an output terminal of the secondary battery and an output terminal of the fuel cell and connected in parallel with the transformer, wherein when the bypass switch is in a conducting state, the second output current of the secondary battery is provided to the aircraft via the bypass switch.

14. The power supply device according to claim 13, wherein the expected situation that the first output terminal voltage of the fuel cell will drop soon comprises the self-maintenance process of the fuel cell; before the self-maintenance process is performed, the bypass switch is conducted in advance; after the self-maintenance process finishes, the bypass switch is disconnected.

15. The power supply device according to claim 13, further comprising a controller electrically connected to the bypass switch and the transformer, wherein the controller is suitable for controlling a conducting state of the bypass switch and detecting a state of the transformer; when the controller detects that the transformer is in an abnormal state, the controller controls the bypass switch to be conducted and makes the secondary battery provide a power greater than a rated output power of the transformer to the aircraft.

16. The power supply device according to claim 15, further comprising a controller electrically connected to the fuel cell, the secondary battery and the transformer, wherein the controller is suitable for detecting the state of the transformer and controls the output voltage of the transformer to be the first output voltage set value or the second output voltage set value.

17. A power supply method of a power supply device according to claim 11, wherein the power supply method comprises:
  providing the first output current to the aircraft by the fuel cell;
  when the first output terminal voltage of the fuel cell is lower than the first output voltage set value, providing the second output current of the secondary battery to the aircraft by the transformer; and
  if it is predicted that the first output terminal voltage of the fuel cell will drop soon, dynamically adjusting the first output voltage set value of the transformer to the second output voltage set value, and providing the second output current of the secondary battery to the aircraft via the transformer.

18. The power supply method according to claim 17, wherein the first output voltage set value is a voltage corresponding to the maximum power value of the characteristic curve of the fuel cell, and the second output voltage set value is a voltage corresponding to the average required power value of the aircraft.

19. The power supply method according to claim 17, wherein the second output voltage set value approximates to the first output terminal voltage and is slightly smaller than the first output terminal voltage of the fuel cell.

20. The power supply method according to claim 17, wherein the power supply device further comprises a bypass switch electrically connected between the secondary battery and the fuel cell and connected in parallel with the transformer, wherein the expected situation of the first output terminal voltage of the fuel cell will drop soon comprises the self-maintenance process of the fuel cell; before the self-maintenance process is performed, the bypass switch is conducted in advance, such that the second output current of the secondary battery is provided to the aircraft via the bypass switch; after the self-maintenance process finishes, the bypass switch is disconnected.

21. The power supply method according to claim 17, wherein the power supply device further comprises a bypass switch electrically connected between the secondary battery and the fuel cell and connected in parallel with the transformer, and the power supply method further comprises:
  under a specific condition, controlling the bypass switch to be conducted, such that the second output current of the secondary battery is provided to the aircraft via the bypass switch instead of the transformer, and the specific condition refers to a situation when a rated output power of the transformer is unable to supply the required power to the aircraft, the transformer is in an abnormal state or the fuel cell performs self-maintenance.

* * * * *